Patented Nov. 24, 1931

1,833,810

UNITED STATES PATENT OFFICE

WILLIAM HOWARD WRIGHT, OF SCHENECTADY, NEW YORK, ASSIGNOR TO SCHENECTADY VARNISH COMPANY, OF SCHENECTADY, NEW YORK, A CORPORATION OF NEW YORK

COMPOSITION AND ARTICLE IMPREGNATED AND COATED THEREWITH

No Drawing.   Application filed November 22, 1928.   Serial No. 321,278.

The present invention relates to an oil-proofing composition, particularly applicable for the impregnation and coating of transformer coils, but also useful for treating various articles to render them water-proof, grease-proof and oil-proof.

A further object of the invention is to provide a composition having the above mentioned properties which at the same time provides a dielectric coating or insulating medium which is highly effective in the electrical arts.

The coating composition, as stated, is oil-proof and grease-proof and it will be understood that transformer coil or other article impregnated with this composition will be provided with a solid film insoluble in the oil, which is usually employed as the cooling medium about transformer coils.

In carrying out the invention, I employ as the ingredients of the composition, an acaroid gum, for example red or yellow gum acaroids, a pure resin in the nature of rosin, colophony or abietric acid, and a basic organic material of the alcohol series, for instance glycerine.

In order to prepare the composition, equal parts of rosin or other resin and an acaroid resin are melted together under a sufficient temperature to render them fluid and to this mixture is added five per cent (5%) of the basic organic material namely the glycerine.

The glycerine is thoroughly incorporated in the mixture and there results a chemical reaction, wherein the rosin and glycerine combine to form an ester.

After the composition has thus been formed, it is permitted to cool and solidify and is then ready for packaging and sale.

It will be understood that the amount of glycerine added to the mixture may vary through limits from one per cent (1%) to fifty per cent (50%), dependent upon the physical and chemical properties of the other ingredients and particularly the relative proportions in which the resin and the acaroid resin are mixed. A preferable composition would be 100 parts rosin, 100 parts gum acaroids and 10 parts glycerine.

In other instances, I have made either the rosin or acaroid resin the dominant ingredient to a large or small amount and, in such cases, obviously, the glycerine content will vary to regulate the melting point and degree of plasticity of the composition.

The solid product obtained by cooling the mixture or composition may be employed as an impregnating agent to form a coating or film by melting it and passing it in contact with the article to be treated in an evacuated space. Of course, it is not necessary to have vacuum conditions, but since this is a usual procedure in impregnation processes, I find that my composition works with decided facility and success under such conditions, as well as under conditions where an evacuated space is not employed.

The impregnating and coating composition herein described while particularly designed for transformer coils which are usually immersed in a cooling medium such as oil, is, nevertheless, equally desirable as an impregnating agent in many other circumstances where an oil-proof, water-proof, insoluble coating or film is required.

In the case of transformer coils, as with other articles, the impregnation is complete and thorough in view of the fluidity of the coating composition, and upon cooling a solid, firm, unsoluble coating or film having the properties of an insulator will result.

It will be understood that this coating may be trimmed, smoothed or otherwise shaped, as desired, to conform to specifications or to provide a uniform coating or impregnation.

It will be understood that the composition may be permitted to cool and, as stated, the solid structure resulting may be suitably packaged for shipping.

On the other hand, the composition may be made up in fluid form and passed directly to the impregnating or coating apparatus.

What I claim is:

1. A coating and impregnating composition comprising the reaction product of gum acaroids, a resin, and glycerine.

2. An article impregnated with a reaction product of gum acaroids, a resin, and glycerine to form a solid insoluble coating.

3. An article coated with a reaction product of gum acaroids, rosin, and glycerine.

4. An electric conductor coated with a reaction product of gum acaroids, a resin, and glycerine to form a solid insoluble insulating film upon the conductor.

5. An electric conductor coated with a reaction product of gum acaroids, rosin, and glycerine to form a solid insoluble insulating film upon the conductor.

In testimony whereof I have hereunto set my hand.

WILLIAM HOWARD WRIGHT.